(12) United States Patent
Chen

(10) Patent No.: US 8,652,285 B2
(45) Date of Patent: Feb. 18, 2014

(54) METHOD FOR PRODUCING A BASEBALL OR SOFTBALL

(76) Inventor: Shyi-Ming Chen, Kaohsiung (TW)

( * ) Notice: Subject to any disclaimer, the term of this patent is extended or adjusted under 35 U.S.C. 154(b) by 0 days.

(21) Appl. No.: 13/450,469

(22) Filed: Apr. 19, 2012

(65) Prior Publication Data

US 2013/0206339 A1 Aug. 15, 2013

(30) Foreign Application Priority Data

Feb. 13, 2012 (CN) .......................... 2012 1 0031259

(51) Int. Cl.
*B32B 37/14* (2006.01)
*B32B 37/06* (2006.01)

(52) U.S. Cl.
USPC .......................................... 156/245; 156/390

(58) Field of Classification Search
USPC .......................................................... 156/245
See application file for complete search history.

(56) References Cited

U.S. PATENT DOCUMENTS

| | | | | |
|---|---|---|---|---|
| 3,256,019 A | * | 6/1966 | Barton | 473/597 |
| 4,134,167 A | * | 1/1979 | Kazuo | 428/35.6 |
| 4,154,789 A | * | 5/1979 | Delacoste | 264/138 |
| 4,808,272 A | * | 2/1989 | Molitor | 205/70 |
| 6,045,665 A | * | 4/2000 | Ohhashi et al. | 204/192.12 |
| 2001/0038167 A1 | * | 11/2001 | Brune | 264/278 |
| 2003/0045384 A1 | * | 3/2003 | Yang | 473/598 |
| 2004/0034122 A1 | * | 2/2004 | Lacy | 523/210 |
| 2007/0042828 A1 | * | 2/2007 | Krushke et al. | 472/92 |

* cited by examiner

*Primary Examiner* — Philip Tucker
*Assistant Examiner* — Vicki Wu
(74) *Attorney, Agent, or Firm* — Chun-Ming Shihx

(57) ABSTRACT

A method for producing baseballs and softballs, whereby a spherical core is independently formed and then a fiber material layer is attached, this fiber material layer is evenly brushed with a layer of polyurethane (PU), and this spherical core is placed in a ball cover mold made up of two or more mold pieces, and then heated, and finally the mold is removed to reveal the complete ball. Utilizing the production tool of this invention to produce the baseballs and softballs, whereby PU is brushed onto, and penetrates into the fiber material layer on the independently formed spherical core, resulting in the ball cover forming, the ball cover and spherical core attaches and fits firmly, and the porous construction of this fiber material layer attracts air, and therefore greatly avoids bubbles forming when the outer cover is formed, which affects the quality and lifespan of the ball.

6 Claims, 4 Drawing Sheets

METHOD FOR PRODUCING A BASEBALL OR SOFTBALL

BACKGROUND OF THE INVENTION

1. Field of the Invention

This invention relates to a method for producing baseballs and softballs, specifically a production process for baseballs and softballs and the ball covers thereof.

2. Description of Related Art

Presently, the main structure of formal baseballs and softballs for competition consists mainly of an elastic spherical core part being wrapped in an outer leather cover. Because of the material of the leather covers and the higher labor costs, the production rate is low and there is a lack of uniformity in the balls, and therefore polyurethane (PU) material has conveniently been used for the ball covers. Concerning this PU material used for the ball covers, and the current production method for producing the ball covers of the softballs or baseballs, the current method generally requires an independently formed spherical core being placed in the mold cavity of two attaching semicircular molds, or this spherical core is placed in the mold cavity of two corresponding figure of 8 shaped ball cover molds which join to form the mold cavity of the mold, and then PU material is injected into the ball cover mold cavity to cover the spherical core placed in the mold, and finally the molds are removed to reveal the complete ball.

This production method still has some flaws in the production process. After PU material is injected through the inlet grooves on the ball cover mold to the spherical core placed in the cavity of the ball cover mold, the PU material covers the spherical core, and when heated foam is formed. Air outlets are set on both sides of the inlet grooves which connect to the inside of the mold, but as these outlets are only situated at the top, when the mold is heated and the foam is produced, the gas possibly can't all be released out the air outlets, and this small amount of gas which can't be expelled forms air bubbles in the PU in the mold, and these bubbles left in the outside cover result in uneven integrity and thickness of the outside covers, and thus result in flaws in the outside covers.

The outside cover is formed by injecting liquid PU material onto the spherical core, and because this spherical core is made from either PU, rubber or cork, the surface of this spherical core doesn't have a strong bond, and doesn't attach strongly to the foam formed in the PU, resulting in a loose attachment between the spherical core and ball cover, which results in a shortened lifespan and the ball easily changing shape.

Therefore, how to solve the above problems is an issue demanding a prompt solution by industry.

SUMMARY OF THE INVENTION

This purpose of this invention is to provide a method for producing a baseball or softball, by solving the problem of bubbles being produced in the ball cover and the loose attachment between the spherical core and ball cover in the conventional technique.

To achieve the above mentioned goals, this invention solves the problems by utilizing the following methods:

A method for producing a baseball or softball, includes the following steps:
(a) firstly forming an independent spherical core;
(b) attaching a fiber material layer on the outer surface of the spherical core, and the fiber material layer is then evenly brushed with a thin layer of PU;
(c) placing the spherical core into two pieces or multiple pieces of ball cover molds;
(d) putting aside or heating for molding; and
(e) finally removing the molds to reveal a complete shaped ball.

In step (a), the spherical core is one selected from the group consisting of: a PU, a rubber, a cork and multi-layer winding yarn.

In step (b), the fiber material layer is one of a non-woven fabric and a woven cloth.

In step (b), the fiber material layer is one of a cotton yarn and a woolen yarn.

In step (c), the ball cover mold is constructed from two corresponding figure of 8 shaped mold pieces, the two mold pieces fitting together to form the ball cover, the two mold pieces made from a soft material, and a joining edge formed where the two mold pieces meet, and grooves set on an inside of the joining edge to form a raised sewn section on the ball cover and protrusions extending towards an inside of a mold cavity, these protrusions being protruding supports to support the ball core.

Utilizing the producing method of this invention to produce the outer covers for baseballs and softballs, whereby PU is brushed onto, and penetrates into, the fiber material layer on the independently formed spherical core to form a composite layer attaching to the spherical core, and then put aside or heated for molding, so that when the ball cover forms, the ball cover material and the composite layer become one unit, which allows for an enhanced adhesion between the surface of the ball cover and the spherical core, and the ball cover and spherical core attaches and fits firmly, and the porous construction of this fiber material cover attracts air, and therefore greatly avoids bubbles forming when the outer cover is formed, which affects the quality and lifespan of the balls.

BRIEF DESCRIPTION OF THE DRAWINGS

The invention, as well as its many advantages, may be further understood by the following detailed description and drawings in which.

DETAILED DESCRIPTION OF THE INVENTION

The invention, as well as its many advantages, may be further understood by the following detailed description and drawings:

Please refer to FIG. 1 to FIG. 4, the method for producing the ball cover of the baseballs and softballs, includes the following specific steps:
(a) firstly forming an independent spherical core 1;
(b) attaching a fiber material layer on the outer surface of the spherical core 1, and the fiber material layer 2 is then evenly brushed with a thin layer of PU 3;
(c) placing the spherical core 1 into a ball cover mold 4;
(d) putting aside or heating for molding; and
(e) finally removing the mold to reveal a complete shaped ball.

Figure 1:
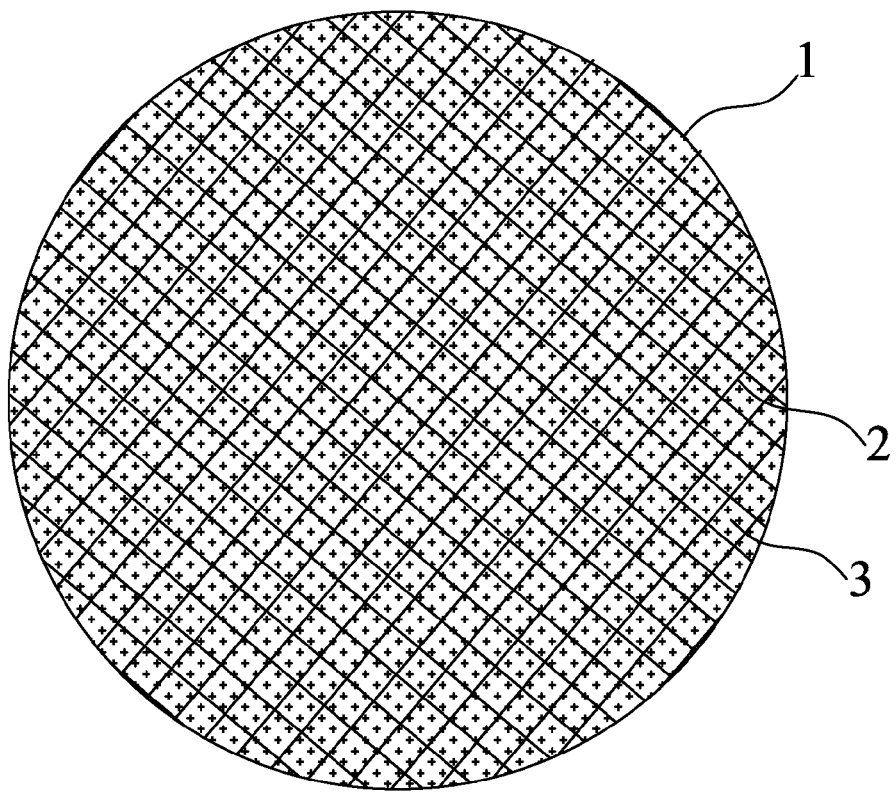
FIG. 1 is a structural schematic diagram showing the spherical core covered by the fiber material layer of the present invention.
Figure 2:
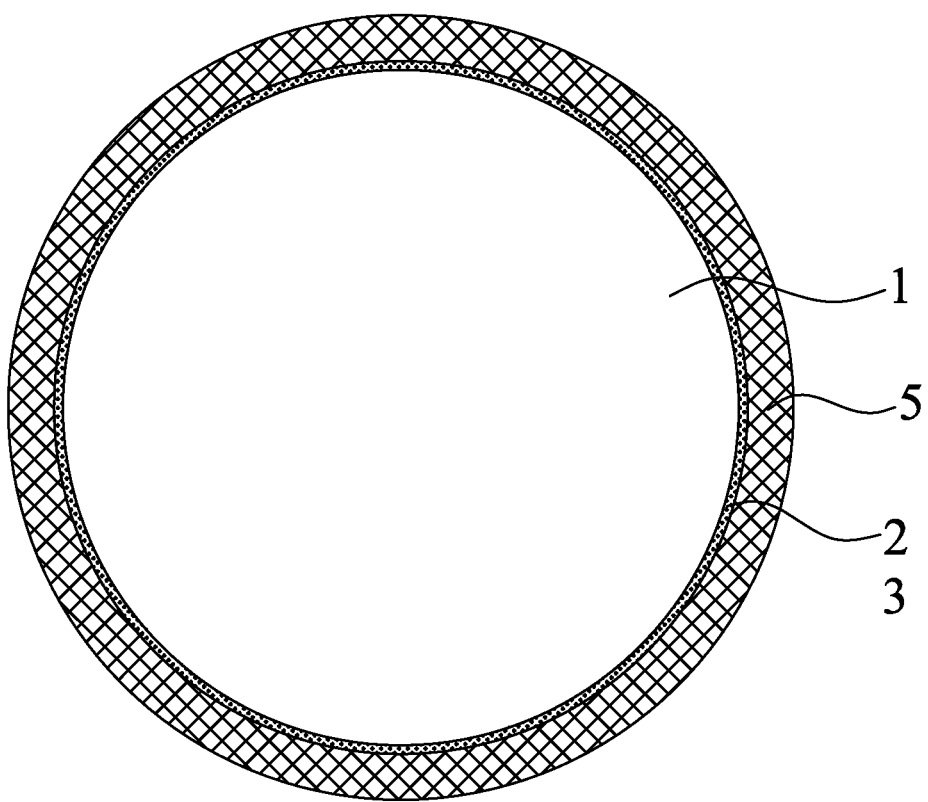
FIG. 2 is a cross sectional diagram showing the formed sphere of the present invention.

Please again refer to both FIG. 1 and FIG. 2, which show the independently formed spherical core 1 used in the present invention, whereby the spherical core is selected from one of the following: a PU, a rubber, a cork and multi-layer winding yarn.

In this invention, before the spherical core 1 is put into the ball cover mold 4, the fiber material layer 2 is first attached, wound and wrapped onto the outer surface of the spherical core 1. The fiber material is a porous structure when distributed, and is one selected from the following: a fiber cotton yarn, a woolen yarn, a fiber winding layer and a woven cloth. In this embodiment, the fiber material layer 2 utilizes a non-woven fabric to be coated on the surface of the spherical core 1, the non-woven fabric is evenly brushed with a thin layer of PU to form the PU layer 3, and which allows the PU to penetrate into the non-woven fabric to form a composite layer, therefore the PU fiber layer attaches and fits onto the outer surface of the spherical core 1.

Figure 3:
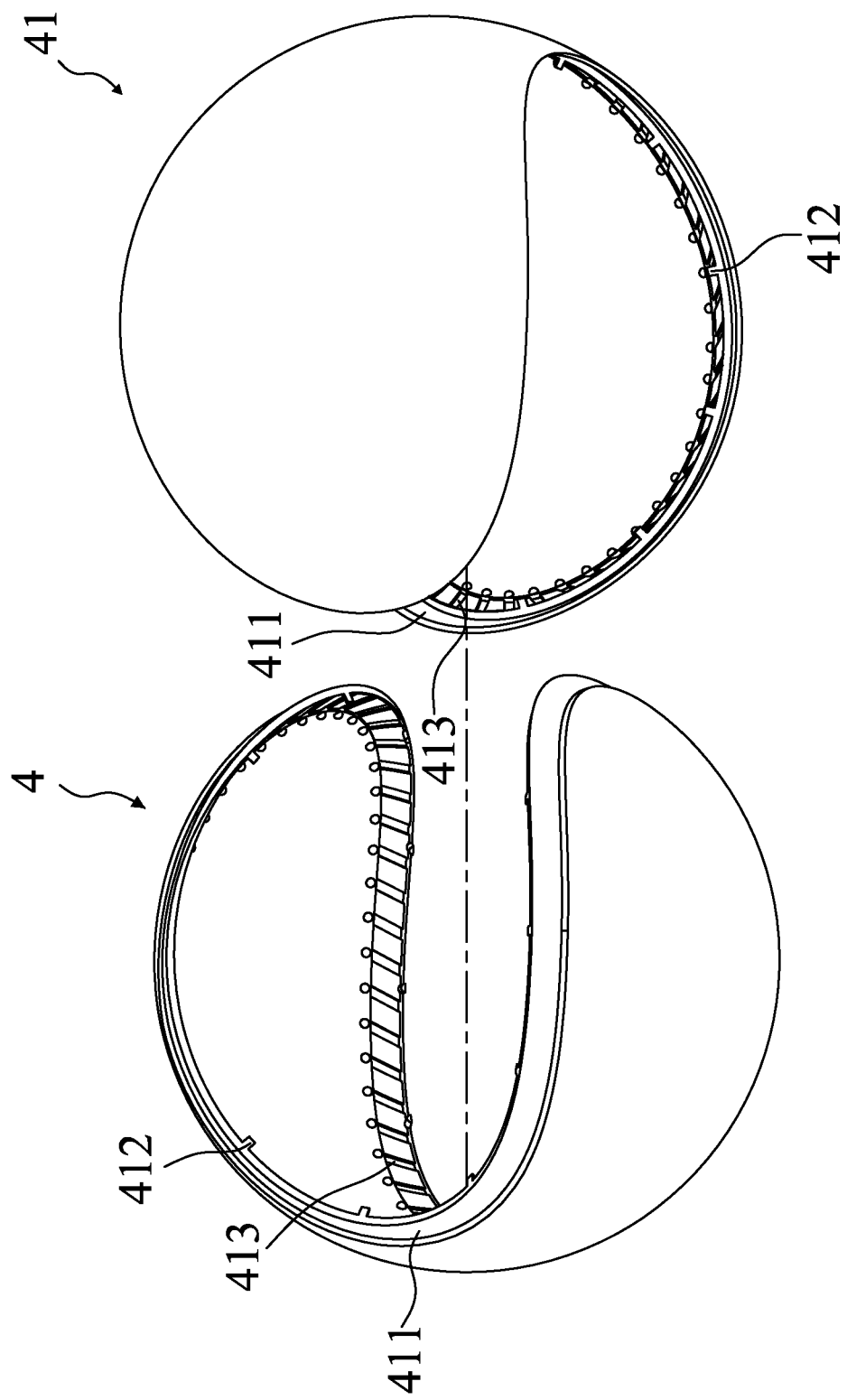
FIG. 3 is a schematic diagram showing the embodiment of the ball cover mold of the present invention.
Figure 4:
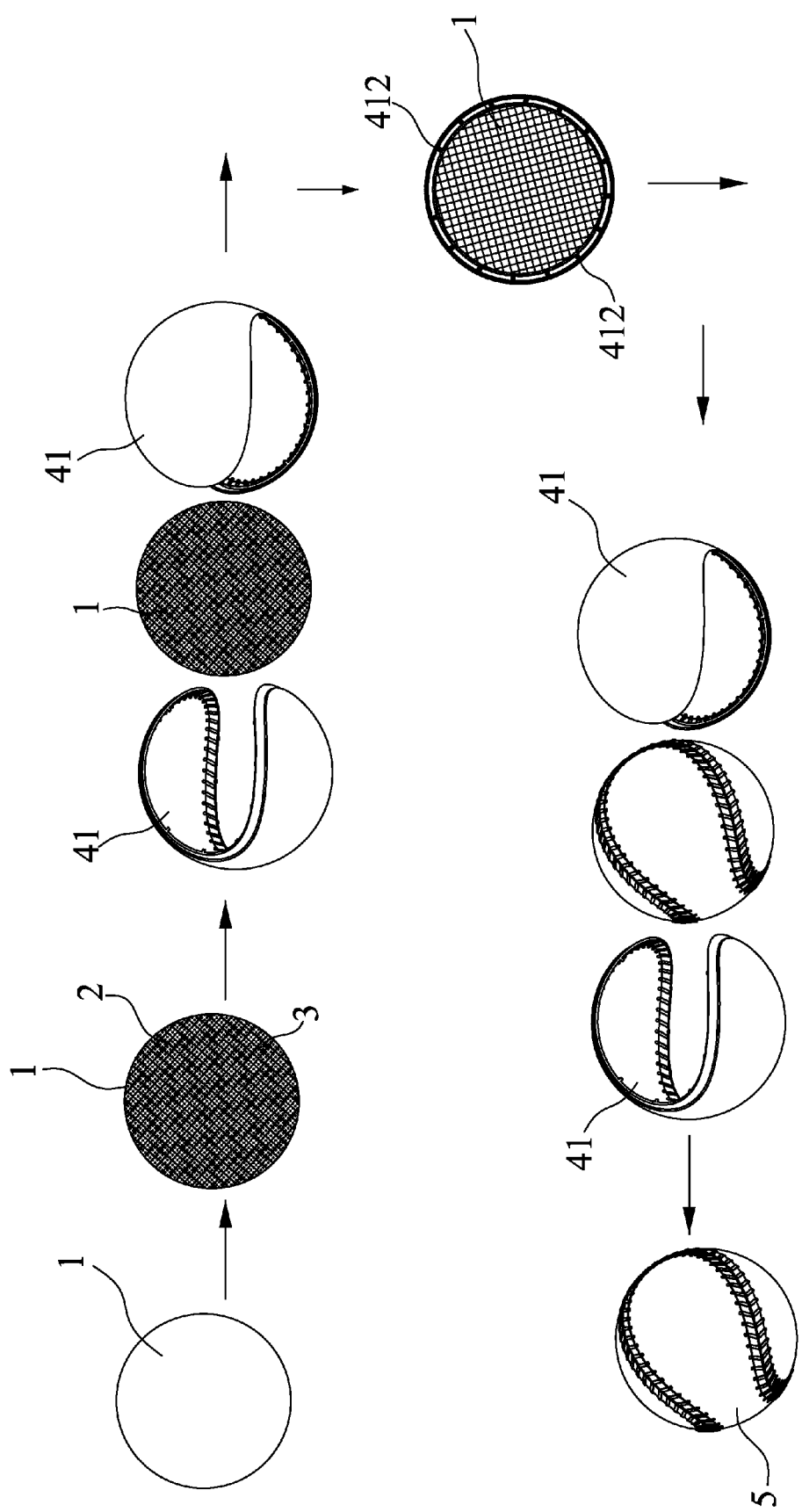
FIG. 4 is a schematic diagram showing the production process of the present invention.

Please refer to both FIG. 3 and FIG. 4, and then the spherical core 1 coated with the non-woven fabric, is placed in the ball cover mold 4 to form a ball cover 5. In this embodiment, the ball cover mold 4 is constructed from two corresponding figure of 8 shaped mold pieces 41, the two mold pieces 41 fitting together to form the ball cover, the two mold pieces 41 made from a soft material, a joining edge 411 formed where the two mold pieces 41 meet, and grooves 413 set on an inside side of the joining edge 411 to form a raised sewn section on the ball cover 5 and protrusions 412 extending towards an inside of a mold cavity, these protrusions 412 being protruding supports to support the ball core 1 and to control the thickness of the ball cover 5.

The two mold pieces 41 have the same structures, which fit together to form the complete ball cavity, and the ball cover mold 4 used in the invention can certainly also be constructed from two hemispherical molds which fit together.

Using the PU material can effectively reduce the cost of materials; moreover using the mold 4 of the ball cover to directly form a ball cover in one step and produced by mechanization, can effectively improve productivity and ensure a unified performance of the products. The ball cover 5 formed as one body, having a good outside integrated appearance, can effectively improve the lifespan of the balls.

When the ball cover 5 is formed in the mold 4 of the ball cover at high temperature, the non-woven cloth on the surface of the spherical core 1 has the properties of high temperature resistance, porosity, moisture permeability and ventilation.

The PU is smeared onto, and finally penetrates into the non-woven cloth, so that the non-woven cloth is further cured, and attaches and fits onto the surface of the spherical core 1.

In the process of high temperature injection molding, the PU material is coated on the spherical core 1, the PU material in the non-woven cloth can be fused with the spherical core 1, when the PU is at the high-temperature and foam forms, a part of the gas is unable to be timely and completely expelled out, and some small bubbles can be absorbed by the non-woven cloth (i.e. the fiber material layer 2) with the porous structure which has air absorbing properties, and therefore greatly avoids the issue of generating bubbles unevenly and untimely during the foam molding process.

Finally the mold is removed to reveal a complete shaped ball.

Utilizing the producing method of this invention to produce the ball cover 5 for baseballs and softballs, whereby PU is brushed onto, and penetrates into the fiber material layer 2, which is a non-woven fabric in this embodiment, and forms a composite layer attached on the independently formed spherical core 1, so that when the ball cover 5 forms, the ball cover 5 PU material and the composite layer become one unit, which allows for enhanced adhesion between the surface of the ball cover 5 and the spherical core 1, and the ball cover 5 and spherical core 1 attach and fit firmly together, and the porous construction of this fiber material cover attracts air, and therefore greatly avoids bubbles forming when the ball cover 5 is formed, affecting the quality and lifespan of the balls.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method for producing a baseball or softball, comprising the following steps:
   (a) firstly forming an independent spherical core;
   (b) attaching a fiber material layer with a porous structure on the outer surface of the spherical core, and the fiber material layer being then evenly brushed with a layer of polyurethane (PU) to penetrate into the fabric material to form a composite layer;
   (c) placing the spherical core into two pieces of ball cover molds, wherein the ball cover molds are constructed from two corresponding figure of 8-shaped mold pieces, the two mold pieces fitting together to form a ball cover, the two mold pieces made from a soft or flexible material and having two joining edges respectively joined to each other, an outer side at one joining edge formed with a stepped surface to engage with another stepped surface formed on an inside side at the other joining edge, and wherein on interior surfaces of the two mold pieces, grooves are set respectively along the two joining edges to form a raised sewn section on a surface of the ball cover so that a mold line on the ball cover formed by the mold pieces is exactly located on the center of the raised sewn section;
   (d) heating the two mold pieces with the spherical core enclosed inside for molding; and
   (e) finally removing the two mold pieces to reveal a complete shaped ball.

2. The method for producing a baseball or softball of claim 1, wherein the spherical core is one selected from the group consisting of: a PU, a rubber, a cork and multi-layer winding yarn.

3. The method for producing a baseball or softball of claim 1, wherein the fiber material layer is one of a non-woven fabric and a woven cloth.

4. The method for producing a baseball or softball of claim 1, wherein the fiber material layer is one of a cotton yarn and a woolen yarn.

5. The method for producing a baseball or softball of claim 1, wherein the fiber material layer is a non-woven fabric.

6. The method for producing a baseball or softball of claim 1, wherein protrusions extend from the interior surfaces of the two mold pieces towards an inside of a mold cavity to support the spherical core and to control a thickness of the ball cover.

* * * * *